United States Patent
Dobschal et al.

(10) Patent No.: US 11,054,651 B2
(45) Date of Patent: Jul. 6, 2021

(54) SPECTACLE LENS FOR AN IMAGING OPTICAL UNIT AND DATA GOGGLES

(71) Applicant: tooz technologies GmbH, Aalen (DE)

(72) Inventors: Hans-Juergen Dobschal, Kleinromstedt (DE); Matthias Hillenbrand, Jena (DE); Guenter Rudolph, Jena (DE)

(73) Assignee: tooz technologies GmbH, Aalen (DE)

(*) Notice: Subject to any disclaimer, the term of this patent is extended or adjusted under 35 U.S.C. 154(b) by 107 days.

(21) Appl. No.: 16/303,134

(22) PCT Filed: May 15, 2017

(86) PCT No.: PCT/EP2017/061575
§ 371 (c)(1),
(2) Date: Nov. 19, 2018

(87) PCT Pub. No.: WO2017/198596
PCT Pub. Date: Nov. 23, 2017

(65) Prior Publication Data
US 2020/0192122 A1      Jun. 18, 2020

(30) Foreign Application Priority Data
May 20, 2016   (DE) .......... 102016109288.6

(51) Int. Cl.
*G02B 27/01*   (2006.01)
(52) U.S. Cl.
CPC .... *G02B 27/0172* (2013.01); *G02B 2027/015* (2013.01); *G02B 2027/0123* (2013.01); *G02B 2027/0178* (2013.01)
(58) Field of Classification Search
CPC ........ G02B 27/0172; G02B 2027/0123; G02B 2027/015; G02B 2027/0178
See application file for complete search history.

(56) References Cited

U.S. PATENT DOCUMENTS

| | | | |
|---|---|---|---|
| 2012/0057253 A1* | 3/2012 | Takagi | G02B 27/0172 359/861 |
| 2014/0226215 A1* | 8/2014 | Komatsu | G02B 17/0856 359/631 |

(Continued)

FOREIGN PATENT DOCUMENTS

| | | |
|---|---|---|
| CN | 103364951 A | 10/2013 |
| CN | 204758854 U | 11/2015 |

(Continued)

OTHER PUBLICATIONS

International Preliminary Report on Patentability rendered by the International Bureau of WIPO for PCT/EP2017/061575, dated Nov. 29, 2018, 10 pages.

(Continued)

*Primary Examiner* — Wen Huang
(74) *Attorney, Agent, or Firm* — Skaar Ulbrich Macari, P.A.

(57) ABSTRACT

A spectacle lens for an imaging optical unit for producing a virtual image of an output image presented on an image generator includes an inner surface facing the eye and an outer surface facing away from the eye, an input coupling section, and an output coupling structure. The imaging beam path is guided to the output coupling structure by way of reflections between the inner surface and the outer surface. A reflection surface having a concave curvature when seen from the interior of the spectacle lens is present between the input coupling section and the output coupling structure in the region of the inner surface and/or in the region of the outer surface. The curvature of said reflection surface differs from a basic curvature of the inner surface or of the outer surface of the spectacle lens.

18 Claims, 5 Drawing Sheets

(56) References Cited

U.S. PATENT DOCUMENTS

2015/0253487 A1    9/2015  Nichol et al.
2016/0131907 A1*  5/2016  Martinez ............ G02B 17/0832
                                                                     359/631
2016/0178908 A1    6/2016  Dobschal et al.

FOREIGN PATENT DOCUMENTS

| DE | 102013214700 A1 | 1/2015 | | |
|---|---|---|---|---|
| DE | 102014118490 A1 | 6/2016 | | |
| EP | 0790516 A1 | 8/1997 | | |
| WO | WO-2015011288 A1 * | 1/2015 | ......... | G02B 27/0172 |

OTHER PUBLICATIONS

The Written Opinion rendered by the International Searching Authority for PCT/EP2017/061575, dated Aug. 2, 2017, 12 pages.
Office Action to the corresponding European Patent Application No. 17723389.7 rendered by the European Patent Office (EPO) dated Nov. 20, 2020, 6 pages.
Office Action to the corresponding Chinese Patent Application rendered by The China National Intellectual Property Administration(CNIPA) dated Nov. 26, 2020, 11 pages (including English translation).

\* cited by examiner

SPECTACLE LENS FOR AN IMAGING OPTICAL UNIT AND DATA GOGGLES

PRIORITY

This application claims the benefit of German Patent Application No. 10 2016 109 288.6, filed on May 20, 2016, which is hereby incorporated herein by reference in its entirety.

FIELD

The present invention relates to a spectacle lens for an imaging optical unit for generating a virtual image of an initial image represented on an image generator. In addition, the invention relates to an imaging optical unit and data goggles.

BACKGROUND

Data goggles are a special form of a head-mounted display. One conventional form of head-mounted displays uses screens that are worn in front of the eyes and present the user with electronic images such as, for instance, computer-generated images or images recorded by cameras. Such head-mounted displays are often voluminous and do not allow direct perception of the surroundings. In recent years, head-mounted displays have been developed which are able to combine electronic images with the directly perceived image of the surroundings and thus to present the user with an electronic image, without preventing direct perception of the surroundings. Such head-mounted displays, which will be referred to as data goggles hereinafter, enable this technology to be utilized in everyday life.

When combining the electronic images with the directly perceived image of the surroundings, a distinction is drawn essentially between the following principles on which the combining can be based:
1. Using normal spectacles with a beam combiner (e.g. beam splitter cube) attached at the front.
2. Directly coupling in the light from the side by way of a reflection at the inner side of the spectacle lens, wherein diffraction gratings, Fresnel elements or the like are used in a supporting manner.
3. Guiding the light of the electronic image by means of total internal reflection in the spectacle lens and combining the beam path of the electronic image with the direct image of the surroundings with the aid of an output coupling structure arranged in the spectacle lens and serving for coupling the beam path of the electronic image out from the spectacle lens in the direction of the eye. A corresponding spectacle lens is described e.g. in DE 10 2014 118 490 A1.

Although the first principle functions very well optically, it has only very low social acceptance since the beam combiner attached at the front is outwardly very conspicuous and large. Moreover, the spectacles become front-heavy as a result.

The second principle can be realized anatomically only with a greatly increased distance between spectacles and head, which is likewise unacceptable.

Therefore, the more promising approaches proceed from the third principle, that is to say guiding light in the spectacle lens. In this case, the output coupling structure can be configured as a diffraction grating, as a partly transparent inclined mirror or in the form of partly transparent Fresnel elements. In the case of a diffraction grating, the beam path of the electronic image is coupled out from the spectacle lens e.g. via the 1st order diffraction maximum, while via the 0 order diffraction maximum the observation light can pass through the output coupling structure with as little impairment as possible.

In the course of coupling out the fundamental problems described below arise, however, which depend in particular on the principle used.

When coupling out the beam path of the electronic image by means of a diffraction grating it is necessary to use gratings of the same frequency for both the input and the output coupling of the beam path, in order to prevent unreasonable spreading of the spectrum. The étendue of the imaging beam of rays, which in the context of the further explanations can be regarded for simplification as the product of the field of view angle of the horizontal field of view and the horizontal extent of the eyebox (that region of the light pipe in the imaging beam path in which the pupil of the eye can move without vignetting of the image taking place), is greatly restricted in this case. This is owing to the fact that, on the one hand, the diffraction angle for the blue light must be of sufficient magnitude that total internal reflection is achieved in the glass, but on the other hand the diffraction angle for the red light must not be more than 90 degrees. An additional factor is the requirement made of the field of view angle of the horizontal field of view, as a result of which this boundary condition is tightened further. In this case, the diffraction efficiency is problematic as well, since the diffraction twice means that a large amount of light is lost and, moreover, a homogeneous efficiency over the spectrum is virtually impossible to achieve.

When coupling out the beam path of the electronic image by means of an inclined mirror, the maximum spectacle lens thickness that can be afforded tolerance constitutes a hard limit. In order to achieve the total internal reflection, the output coupling mirror must have a minimum tilt angle. Since said mirror has to fit into a spectacle lens that is relatively thin for esthetic reasons, it can thus only be relatively narrow, which means that the transported étendue proves to be very low.

When coupling out the beam path of the electronic image by means of Fresnel elements, fewer disadvantages occur since here, firstly, there is no spectral dependence and, secondly, the Fresnel element, unlike the output coupling mirror, need not be inclined relative to the inner surface or the outer surface. Nevertheless, even in the case of coupling out the beam path of the beam path with the aid of Fresnel elements, increasing the étendue is desirable.

SUMMARY

An object herein is to provide a spectacle lens for an imaging optical unit, which spectacle lens enables a larger value for the étendue. Another object is to provide an imaging optical unit and data goggles which enable a larger value for the étendue.

Provided herein is a spectacle lens for an imaging optical unit for generating a virtual image of an initial image represented on an image generator. The spectacle lens can include an inner surface that is to face the eye and an outer surface that is to face away from the eye, an input coupling section for coupling an imaging beam path emanating from the initial image in between the inner surface and the outer surface of the spectacle lens, and an output coupling structure present in the spectacle lens and serving for coupling the imaging beam path out from the spectacle lens in the direction of the eye. In this case, the imaging beam path is guided by reflections between the inner surface and the outer surface to the output coupling structure. Between the input coupling section and the output coupling structure in the region of the inner surface, in the spectacle lens according to the invention, and/or in the region of the outer surface there is at least one reflection surface which is curved concavely as viewed from the interior of the spectacle lens—and thus has a converging effect on the imaging beam path—and the curvature of which differs from a basic curvature of the inner surface and/or the outer surface of the spectacle lens. The output coupling structure is then preferably configured exclusively in beam-deflecting fashion, that is to say without a converging or diverging effect.

A converging effect is achieved with the concavely curved reflection surface, with the aid of which effect the étendue can be increased. If the beam path through the spectacle lens is considered in reverse—that is to say from the eye to the input coupling section and thus counter to the actual course—in the direction of the input coupling section with the aid of the converging effect of the reflection surface it is possible to carry out a focusing of the beam of rays incident on the output coupling structure in a substantially collimated manner from the eyebox in the direction of the input coupling section. As a result, firstly, owing to the tapering beam cross section first of all for the reflection surfaces following in the direction of the input coupling section a smaller lateral extent is required and, secondly, what can be achieved is that the beam of rays in the region of the input coupling section can have a significantly reduced beam cross section in comparison with a spectacle lens without a concavely curved reflection surface, which facilitates coupling into the spectacle lens. As a result, the space requirement between image generator and spectacle lens can be reduced, and in the most favorable case it is possible to dispense with the input coupling unit used hitherto for coupling an imaging beam path emanating from the initial image in between the inner surface and the outer surface of the spectacle lens. In this case, the image generator can be arranged directly at the input coupling section or directly in the vicinity of the input coupling section. In both cases the input coupling is carried out without the interposition of an input coupling unit.

In the spectacle lens, at least that reflection surface at which the last reflection of the imaging beam path takes place upstream of the output coupling structure is configured as a concavely curved reflection surface. As a result, the beam cross-section reduction of the imaging beam path (viewed in reverse, that is to say from the eye to the input coupling section and thus counter to the actual course) commences earlier, such that the lateral extent of the subsequent reflection surfaces for a given field angle can be kept as small as possible, or the largest possible field angle can be achieved for a given lateral extent of the subsequent reflection surfaces. Moreover, it is possible to achieve the reduction of the beam cross section in the region of the input coupling section with a long focal length, such that the curvature of the reflection surface can be kept as small as possible relative to the basic curvature of the inner surface and/or the outer surface of the spectacle lens.

It is also advantageous if at least that reflection surface at which the penultimate reflection of the imaging beam path takes place upstream of the output coupling structure is configured as a concavely curved reflection surface, since the latter is then situated at the same surface of the spectacle lens as the output coupling structure, which entails production engineering advantages since both can then be produced in common work steps. If the concavely curved reflection surface is situated at the outer surface of the spectacle lens, said outer surface usually likewise being curved concavely as viewed from the interior of the spectacle lens, the deviation from the basic curvature of the spectacle lens need not, moreover, turn out to be as great as in the case of an arrangement of the concavely curved reflection surface at the inner surface of the spectacle lens, said inner surface generally having a convex curvature as viewed from the interior of the spectacle lens.

It goes without saying that there is also the possibility of configuring two or more of the reflection surfaces as concavely curved reflection surfaces, such that the converging effect can be divided among a plurality of reflection surfaces, which in turn enables a smaller deviation of the respective reflection surfaces from the basic curvatures of the spectacle lens surfaces in which they are formed.

In the spectacle lens, the reflections of the imaging beam path can be based at least partly on total internal reflection at the inner surface and/or the outer surface. In one embodiment of the spectacle lens, the at least one concavely curved reflection surface is a surface section which is formed in the inner surface and/or the outer surface of the spectacle lens and which is curved concavely as viewed from the interior of the spectacle lens and the curvature of which differs from the basic curvature of the inner surface and/or the outer surface of the spectacle lens.

In principle, it is possible for the total internal reflection to take place at the interface between the spectacle lens and the surrounding air. In order to protect the inner surface and the outer surface or in order to achieve a specific optical effect or a desired esthetic effect, however, the inner surface and/or the outer surface can also be provided with a coating. In one advantageous configuration of the embodiment of the spectacle lens with reflection based on total internal reflection, the spectacle lens therefore has a transparent main body having a first refractive index, in which the input coupling section is situated and into which the imaging beam path is coupled. Said main body has a main body inner surface corresponding to the inner surface of the spectacle lens, and also a main body outer surface corresponding to the outer surface of the spectacle lens, and the at least one concavely curved surface section is formed in the main body inner surface and/or in the main body outer surface. There is situated in the region of the at least one concavely curved surface section on the main body inner surface and/or the main body outer surface a first layer having a second refractive index. The second refractive index is chosen in relation to the first refractive index such that a total internal reflection of light rays of the imaging beam path takes place at the interface between the main body and the first layer. In other words, the second refractive index meets the condition $n2 < n1 \sin(\theta E)$, wherein $\theta E$ represents an angle of incidence of the light rays of the imaging beam path which emanate from the input coupling section and are incident on the respective reflection section, n1 represents the first refractive index, and n2 represents the second refractive index, and wherein the angle $\theta$ of incidence is chosen in such a way that at least 50% of the light rays of the imaging beam path, in particular at least 75% of the light rays of the imaging beam path, have an angle $\theta$ of incidence $> \theta E$. This ensures that at least 50%, and in particular at least 75%, of the light rays of the imaging beam path on the reflection surface are reflected by total internal reflection. The higher the proportion of the rays reflected by total internal reflection, the brighter the appearance of the observable image for a given image brightness of the initial image.

In the described advantageous configuration of the embodiment of the spectacle lens with reflection based on total internal reflection, a second layer having a refractive index corresponding to the refractive index of the basic material can be situated above the first layer. In the context of the present description, refractive indices corresponding to one another should be understood to mean such refractive indices which differ from one another by not more than 5‰, preferably by not more than 1‰. The optical effect of the reflection surface on transmitted ambient light rays is minimized as a result.

The second layer can in particular be a film having a refractive index corresponding to the refractive index of the basic material or comprise such a film. The first layer and/or the second layer can be configured as adhesive layer, which entails production engineering advantages. In particular, the second layer can comprise an adhesive layer adjoining the first layer and a film adjoining the adhesive layer and having a refractive index corresponding to the refractive index of the basic material. The use of a second layer configured as a film or comprising a film enables the spectacle lens to be encapsulated for protection of the first layer and the lens itself. Moreover, it enables the spectacle lens to be provided with additional functions near the surface. By way of example, for realizing a sunglasses function, an absorption or polarization film can be used in order to reduce the intensity of sunlight reaching the user's eye.

In order to increase the imaging quality of the spectacle lens, there is a possibility that, in the spectacle lens according to the invention, a freeform surface having properties that at least partly correct imaging aberrations is superimposed on the at least one concavely curved reflection surface.

Also provided is an imaging device for generating a virtual image comprises an image generator for representing an initial image with the spectacle lens disclosed herein. The advantages that can be achieved with the imaging device are evident from the explanations concerning the spectacle lens, for which reason reference is made to the explanations concerning the spectacle lens. In particular, the imaging device according to the invention affords the possibility of the image generator being arranged directly at the input coupling section or directly in the vicinity of the input coupling section, that is to say without the interposition of an input coupling unit. However, there is nevertheless the possibility of an input coupling unit for coupling an imaging beam path emanating from the initial image in between the inner surface and the outer surface of the spectacle lens being present between the image generator and the input coupling section. An input coupling unit can be configured e.g. as a prism having an imaging effect.

Further provided are Data goggles that comprise at least one imaging device as disclosed herein. As in the case of the imaging device, the advantages that can be achieved with the data goggles are evident from the explanations concerning the spectacle lens, for which reason reference is made to the explanations concerning the spectacle lens.

Further features, properties and advantages of the present invention will become apparent from the following description of exemplary embodiments with reference to the accompanying figures.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
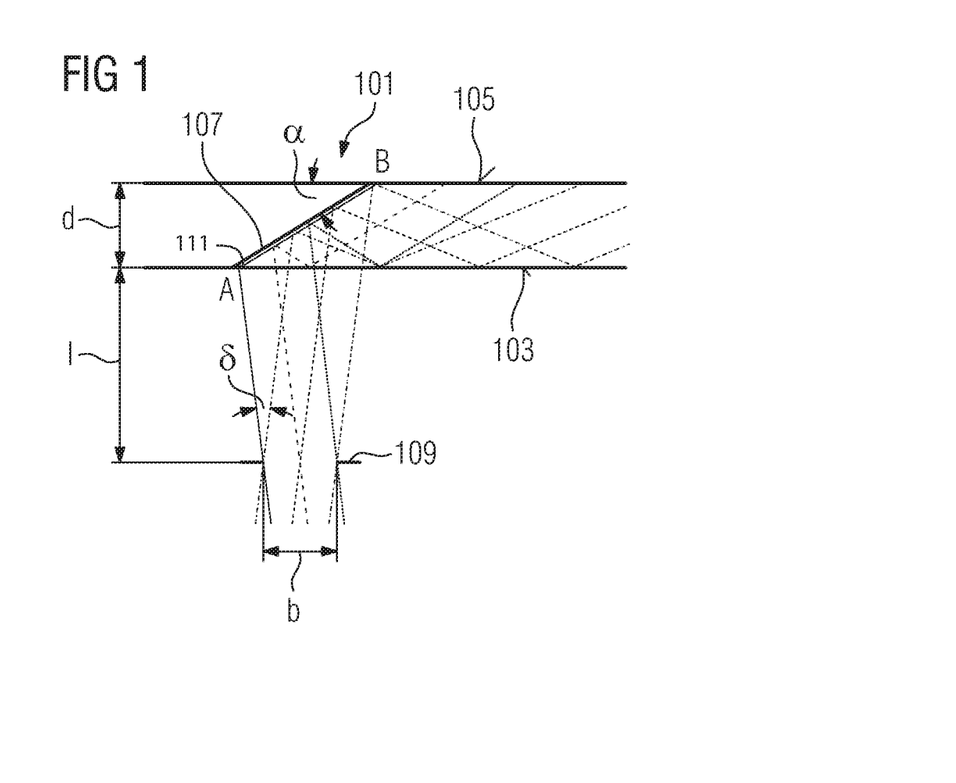
FIG. 1 illustrates the footprint overlap for a conventional spectacle lens with an inclined mirror for coupling out the imaging beam path.

In order to explain the effect of the configuration of the spectacle lens according to the invention, first of all with reference to FIGS. 1 and 2 the problem of the "footprint overlap" will be discussed, which occurs in all three output coupling variants (diffraction grating, inclined mirror and Fresnel elements), but is solved with varying degrees of success.

The problem of the "footprint overlap" for a conventional spectacle lens 101 with an inclined output coupling mirror for coupling out the imaging beam path will be described with reference to FIG. 1. The illustration shows an excerpt from the spectacle lens 101 which shows, alongside the inner surface 103 and the outer surface 105 of the spectacle lens 101, the output coupling mirror 107, which is inclined by the tilt angle α with respect to the outer surface 105. Moreover, FIG. 1 shows the field of view angle δ of the horizontal field of view and the eyebox 109. The eyebox 109 is that three-dimensional region of the light pipe in the imaging beam path in which the pupil of the eye (not illustrated in FIG. 1) can move, without vignetting of the image taking place. Since, in the case of data goggles, the distance of the eye with respect to the data glasses is substantially constant, the eyebox can be reduced to a two-dimensional eyebox that only takes account of the rotational movements of the eye. In this case, the eyebox substantially corresponds to the exit pupil of the data goggles at the location of the entrance pupil of the eye. The latter is generally given by the pupil of the eye.

Although data goggles are a system with which an imaging beam path runs from the image generator to the eyebox 109, for an understanding of the "footprint overlap" it is helpful to consider the beam path in the opposite direction, that is to say from the eyebox 109 to the image generator. Therefore, a light pipe emanating from the eyebox 109 will be considered in the following explanations, wherein the boundaries of the light pipe are determined by the field of view angles δ of the beams of rays propagating from every point of the eyebox in the direction of the spectacle lens.

A ray emanating from the eyebox 109, which ray is reflected by the mirror 107 at the point A lying furthest on the left, is incident on the outer surface 105 of the spectacle lens 101 at the point B after reflection at the mirror 107 and total internal reflection at the point 111 of the inner surface 103. Said point B is no longer permitted to be situated on the mirror 107 since otherwise the ray would be reflected by the mirror 107 a second time and be lost for the imaging as a result. In order to reduce the problem of the "footprint overlap" in the present example, the output coupling mirror 107 would have to be lengthened in order thus to increase the distance between the points A and B, but the angle α by which the mirror 107 is inclined would have to remain unchanged. However, the spectacle lens thickness would increase as a result. The calculation specification for the necessary spectacle lens thickness d for a predefined width b of the eyebox, a predefined distance l between the eyebox and the spectacle lens 101 and a predefined field of view angle δ reads:

$$d = (b + l \tan \delta) \tan \alpha.$$

Figure 2:
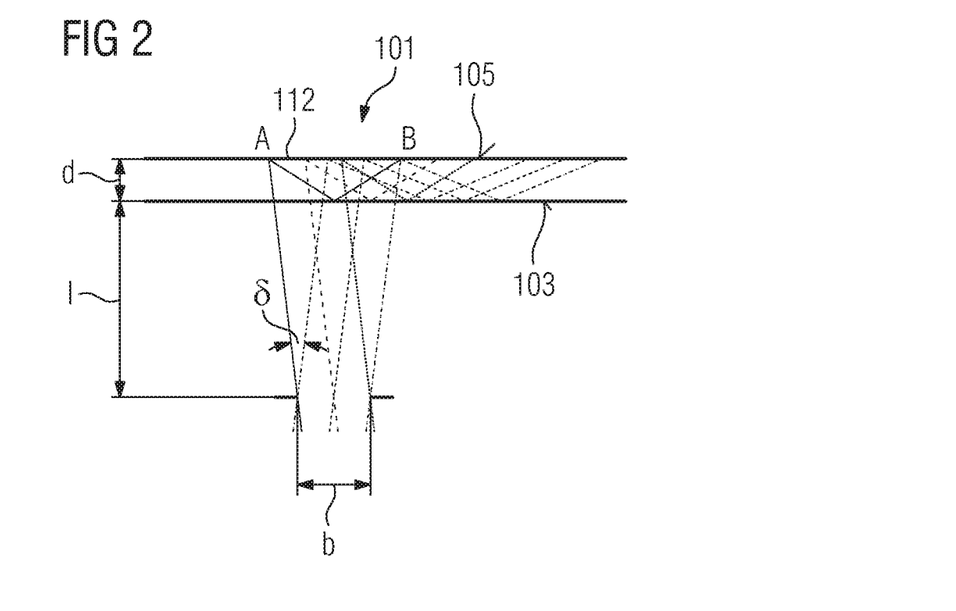
FIG. 2 illustrates the footprint overlap for a conventional spectacle lens with a diffraction grating or a Fresnel element for coupling out the imaging beam path.

FIG. 2 illustrates the problem of the "footprint overlap" for a conventional spectacle lens 101 with a diffraction grating or a Fresnel element as output coupling structure 112 for coupling out the imaging beam path. In this case, the calculation specification for the necessary spectacle lens thickness d for a predefined width b of the eyebox, a predefined distance l between the eyebox and the spectacle lens 101 and a predefined field of view angle δ reads:

$$d = \frac{(b + l \tan \delta)}{2} \tan \alpha,$$

wherein the angle α in the case of the diffraction grating represents the angle of the deflection of the rays that is caused by the diffraction. In the case of the Fresnel element, the angle α represents the title angle by which the Fresnel facets of the Fresnel element are inclined relative to the outer surface 105 of the spectacle lens 101. The above formulae contain some approximations, which however do not falsify the fundamental relationship.

It is evident already from FIG. 2 (which has the same scale as FIG. 1) that a significantly smaller spectacle lens thickness d or, to put it the other way around, a larger étendue is possible here. As a rule of thumb it holds true that, for the same spectacle lens thickness in each case, the étendue possible with the diffraction grating or the Fresnel element is approximately double that possible with the inclined mirror from FIG. 1.

A further problem that influences the étendue besides that of the "footprint overlap" is the growth of the beam diameter in the imaging beam path with increasing distance from the output coupling structure in the direction of the input coupling section in the spectacle lens. That can be counteracted in the case of the inclined output coupling mirror by providing the output coupling mirror with a converging effect (concave mirror). This is illustrated schematically in FIG. 3, which shows the spectacle lens 101, the inclined concave mirror 113 and the input coupling section 115. It is evident in FIG. 3 that, as a result of the converging effect of the output coupling mirror, the light fits well through the input coupling section 115 of the spectacle lens 101.

In the case of the diffractive output coupling, although analogously more diffractive refractive power could be put into the output coupling grating, this is virtually unmanageable in terms of correction technology since even planar imaging gratings have a spectrally dependent back focus profile and even the other higher-order image aberrations are spectrally variable.

Figure 4:
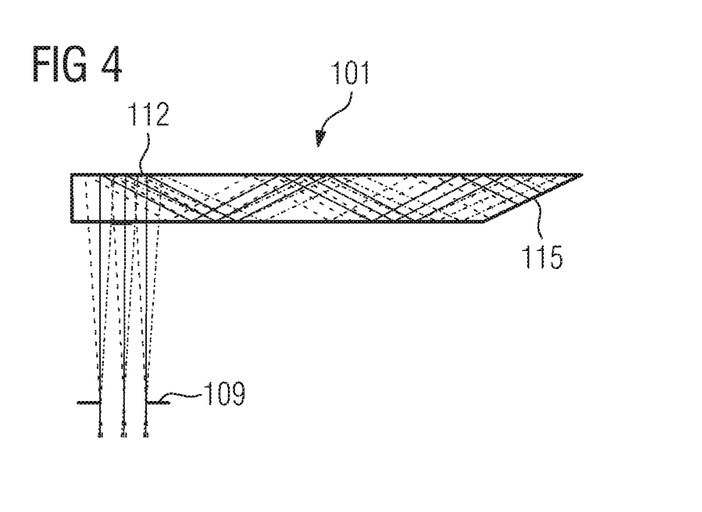
FIG. 4 illustrates, for a conventional spectacle lens with a Fresnel element for coupling out the imaging beam path, the beam diameter of the imaging beam path in the region of the input coupling section.

The Fresnel variant likewise poses problems in this regard since it is necessary to ensure that beam regions emanating from the same image generator point are deflected approximately similarly by all the Fresnel facets. The image performance will otherwise be disturbed. The pupil is segmented as it were by the Fresneling, and that has to be counteracted by a non-imaging behavior of the Fresnel element. Thus essentially only a deflection analogously to a DMD chip is allowed. FIG. 4 illustrates how the light can pass through the exit opening of the goggles in an unimpeded manner only with very great difficulty owing to the non-collimating behavior of the Fresnel element 112. Particularly in the case of a diffraction grating or a Fresnel element as output coupling structure 112, the growth of the beam diameter in the imaging beam path with increasing distance from the output coupling structure constitutes a factor that limits the étendue.

Figure 5:
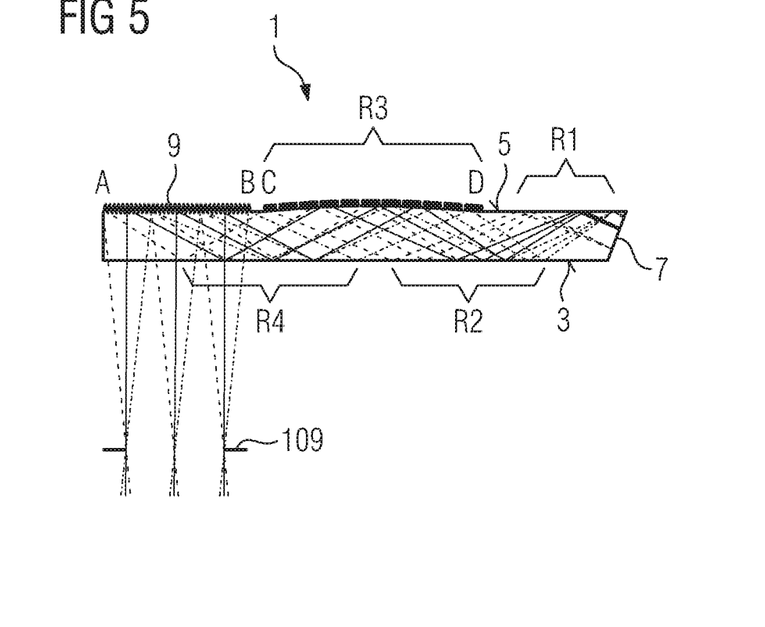
FIG. 5 shows a first exemplary embodiment of a spectacle lens according to the invention comprising a concavely curved reflection surface between the input coupling section and the output coupling structure.

FIG. 5 shows a first exemplary embodiment of a spectacle lens 1 according to the invention for overcoming the problem discussed. The spectacle lens 1 has an inner surface 3 that is to face the eye and an outer surface 5 that is to face away from the eye. Moreover, an input coupling section 7 is present at the edge of the spectacle lens, via which input coupling section an imaging beam path emanating from an initial image represented on an image generator (not shown in FIG. 5) is coupled into the spectacle lens 1 between the inner surface 3 and the outer surface 5. The spectacle lens 1 comprises a Fresnel element 9, which, in the present exemplary embodiment, serves as an output coupling structure for coupling the imaging beam path out from the spectacle lens 1 in the direction of the eye (not illustrated). An imaging beam of rays of the imaging beam path that is coupled into the spectacle lens 1 via the input coupling section 7 is guided via reflections at reflection surfaces R1, R2, R3 and R4 to the Fresnel element 9, by which the beam of rays is then coupled out from the spectacle lens 1 in the direction of the eyebox.

In the exemplary embodiment illustrated in FIG. 5, the guiding of the imaging beam of rays to the Fresnel element 9 is carried out via four total internal reflections at the reflection surfaces R1, R2, R3 and R4. In this case, the total internal reflections of the reflection surfaces R1 and R3 take place at the outer surface 5 of the spectacle lens 1, whereas the total internal reflections of the reflection surfaces R2 and R4 take place at the inner surface 3 of the spectacle lens 1. In this case, the reflection surfaces R1, R2 and R4 have a curvature corresponding to the basic curvature of the spectacle lens 1. The basic curvature of a spectacle lens is typically spherical, wherein the radii are approximately identical if no defective vision is intended to be compensated for by the spectacle lens, or can be different if defective vision is intended to be compensated for. By contrast, the reflection surface R3 has a concave curvature as viewed from the interior of the spectacle lens, said concave curvature deviating from the basic curvature of the outer surface 5 of the spectacle lens 1. In general, the basic curvature of the outer surface 5 of the spectacle lens 1 is also concave as viewed from the interior of the spectacle lens, but the curvature of the reflection surface R3 deviates from the basic curvature in such a way that it has an increased concavity relative to the basic curvature. As a result of this additional concave curvature of the reflection surface R3, a beam of rays emanating from the eyebox 109 is focussed, as a result of which a focus in or in the vicinity of the input coupling section 7 can be achieved. As a result, the beam of rays can be coupled into the spectacle lens even through a relatively narrow input coupling section 7, as a result of which a large étendue can be achieved. It should be noted that, in the case of the consideration just given, the imaging beam path has once again been considered in reverse, that is to say from the eyebox 109 in the direction of the image generator instead of from the image generator in the direction of the eyebox 109.

Figure 3:
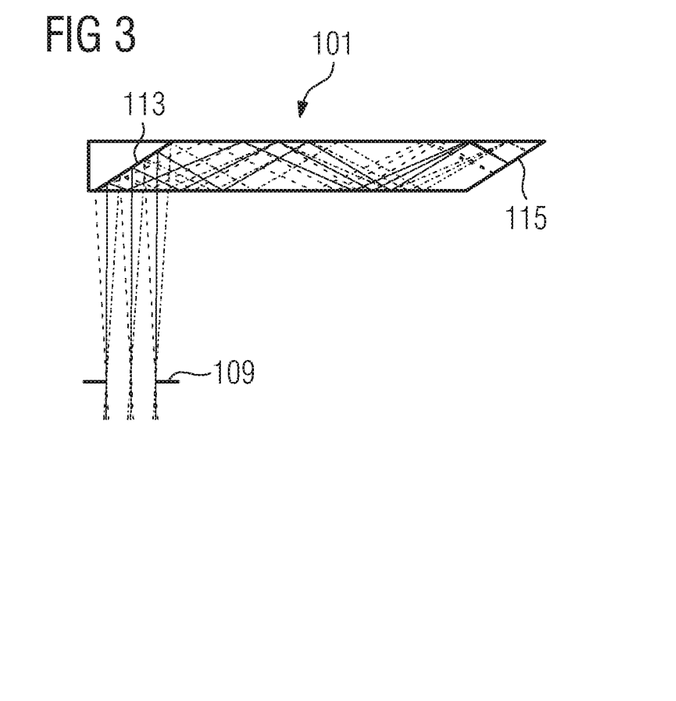
FIG. 3 shows a conventional spectacle lens with an inclined, converging mirror for coupling out the imaging beam path.

By virtue of the fact that in the spectacle lens according to the invention, unlike in the case of the inclined concave mirror from FIG. 3, the converging effect is not brought about by the output coupling structure, with the use of a Fresnel structure 9 as output coupling structure the latter can predominantly be used for beam deflection. As a result, the advantageous properties of the Fresnel structure 9 with regard to the footprint overlap can be combined with the advantages of the converging effect of a concave mirror. Since the concavely curved reflection surface R3 need not be tilted relative to the outer surface 5, no limitation of the étendue arises, and so a large étendue, a large field of view angle δ and a large eyebox can be realized simultaneously. Moreover, the input coupling can be carried out via a relatively narrow input coupling section, such that the provision of a specific input coupling structure can be dispensed with, if appropriate.

For comparison: If the étendue E is regarded for simplification as the product of the field of view angle δ of the horizontal field of view and of the horizontal width of the eyebox, an étendue E of 4 mm×7.5 grd=30 mm*grd results for a glass thickness of 4 mm in the case of the spectacle lens according to the prior art as illustrated in FIG. 2. By contrast, an étendue of E=8 mm×12 grd=96 mm*grd can be achieved in the case of the variant of the spectacle lens according to the invention as illustrated in FIG. 5.

Figure 6:
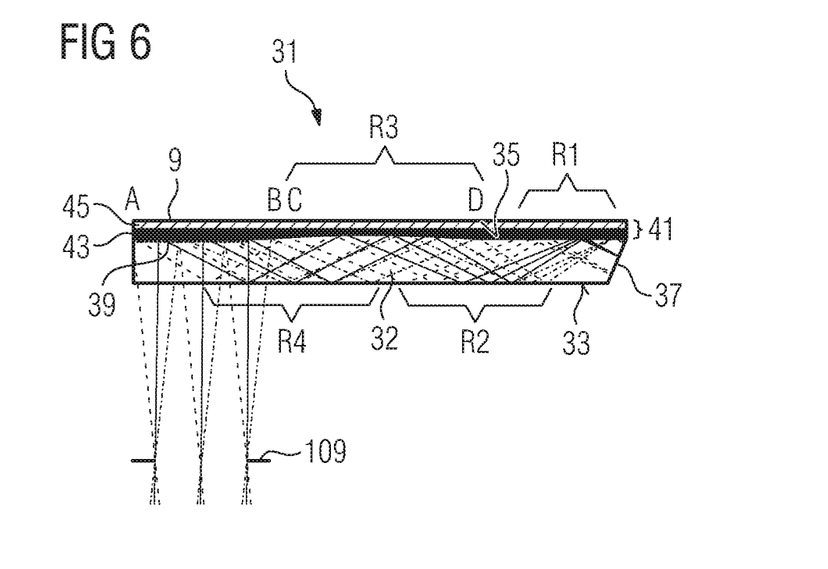
FIG. 6 shows a second exemplary embodiment of a spectacle lens according to the invention comprising a concavely curved reflection surface between the input coupling section and the output coupling structure.

A second exemplary embodiment of a spectacle lens according to the invention is illustrated in FIG. 6. The spectacle lens 31 of the second exemplary embodiment differs from that of the first exemplary embodiment in that it has a main body 32 in the form of a spectacle lens, the Fresnel structure 39 and the concave reflection surface R3 being impressed into the outer surface 35 of said main body (referred to hereinafter as main body outer surface). A two-layered coating 41 is applied on the main body outer surface 35, wherein the first layer 43, directly adjoining the reflection surface R3 and the Fresnel structure 39, has a lower refractive index than the material of the main body 32 and the second, outer layer 45 has a refractive index matched to the refractive index of the material of the main body 32. In this case, the matching of the refractive index of the outer layer 45 is chosen such that, in the present exemplary embodiment, said refractive index differs from the refractive index of the main body material by not more than 1‰. Depending on the application, however a somewhat larger difference in refractive index can also be permitted. At all events, however, the refractive index of the outer layer 45 should not differ from the refractive index of the main body material by more than 5‰. Outwardly the outer layer 45 has a radius of curvature which is suitable for the outer surface of the coated spectacle lens 31 and which substantially corresponds to the basic curvature of the main body 32. The coating 41 can prevent the concave reflection surface R3 from adversely influencing the ambient light passing through it. In this case, the inner layer 43 having the low refractive index ensures that a total internal reflection takes place at the interface between the main body 32 and the coating 41 in the region of the reflection surface R3 and in the region of the Fresnel facets.

In order that a total internal reflection can take place at the interface between the main body 32 and the inner layer 43 of the coating 41, the angles $\theta_E$ of incidence of the rays of the imaging beam path relative to the surface perpendicular of a surface element at which the total internal reflection is intended to take place must be greater than the critical angle $\theta_G$ for the occurrence of total internal reflection. In this case, the critical angle is determined by the ratio of the first refractive index $n_1$, that is to say the refractive index of the material of the main body 32, to the second refractive index $n_2$, that is to say the refractive index of the inner layer 43 of the coating 41, and can be calculated from the equation $$\theta_G = \arcsin(n_2/n_1) \qquad (1).$$

For a given angle $\theta_E$ of incidence of the rays of the imaging beam path on the reflective surface element, which angle results from the design of the main body 32 and the coupling of the imaging beam path into the main body 32 through the input coupling section 37, and for a given refractive index n1 of the material of the main body 32, it is possible to determine the refractive index n2 required for the occurrence of total internal reflection at the interface between the main body 32 and the inner layer 43 of the coating 41. Total internal reflection occurs here if the inequality $$n2 < n1 \, \sin(\theta_E) \qquad (2)$$

is satisfied at the reflective surface element. Since $\sin(\theta_E)$ is always less than or equal to 1, the second refractive index $n_2$ must therefore be less than the first refractive index n1. How much less than $n_1$ depends here on the angle $\theta_E$ of incidence on the surface element—and thus on the design of the main body 32 and the coupling of the imaging beam path into the main body 32.

Although the coating 41 need only be present in the region of the Fresnel structure 39 and the concave reflection surface R3, it is advantageous in terms of production engineering if the coating 41 is applied on the entire main body outer surface 35, as in the exemplary embodiment shown in FIG. 6.

Figure 7:
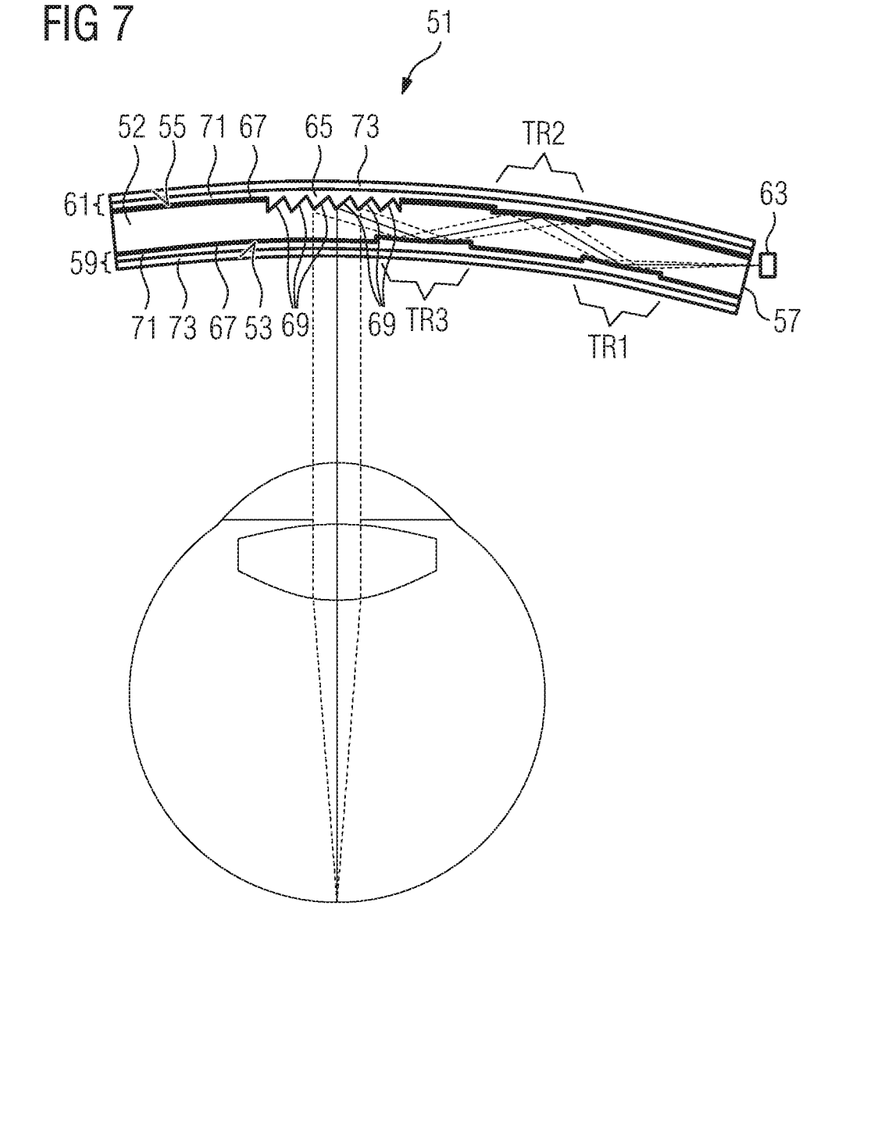
FIG. 7 shows a third exemplary embodiment of a spectacle lens according to the invention comprising a concavely curved reflection surface between the input coupling section and the output coupling structure.

In the context of the present invention, it is also possible for a plurality of the reflection surfaces to be configured as concave reflection surfaces and thus have a converging effect. In this case, the concave reflection surfaces can be arranged both at the inner surface of the main body and at the outer surface of the main body. A corresponding exemplary embodiment is illustrated in FIG. 7. The figure shows a spectacle lens 51 comprising a main body 52 having a main body inner surface 53 that is to face a user's eye, and a main body outer surface 55 that is to face away from the user's eye. Moreover, the spectacle lens 51 comprises coatings 59, 61 applied on the main body inner surface 53 and the main body outer surface 55.

The main body 52 is provided with an input coupling section 57 at its edge. Via the input coupling section 57, a beam of rays of an imaging beam path that emanates from an image generator 63 is coupled into the main body 52 between the main body inner surface 53 and the main body outer surface 55. In the main body 52, the imaging beam path in the present exemplary embodiment is guided via three reflection surfaces TR1, TR2 and TR3, at which a total internal reflection of the imaging beam of rays takes place, to an output coupling structure in the form of a Fresnel element 65, by which the imaging beam path is coupled out from the spectacle lens 51 in the direction of the user's eye.

The reflection surface TR1 and the reflection surface TR3 are formed in the inner surface 53 of the main body 52, whereas the reflection surface TR2 and the Fresnel structure 65 are formed in the outer surface 55 of the main body 52. If the main body 52 is injection-molded from a plastic, for example, the reflection surfaces TR1, TR2 and TR3 and the Fresnel structure 65 can be impressed into the respective main body surface by means of a suitable injection mold.

In the exemplary embodiment illustrated in FIG. 7, all three reflection surfaces TR1, TR2 and TR3 have a concave curvature, such that they have a converging effect.

The coatings 59, 61 applied on the main body inner surface 53 and the main body outer surface 55 are constructed in each case from a plurality of layers. An adhesive layer 67 having a low refractive index is applied in a manner directly adjoining the main body inner surface 53 and/or the main body outer surface 55. The refractive index of the adhesive layer 67 is chosen here such that a total internal reflection of the imaging beam path takes place at the interface between the main body inner surface 53 and the adhesive layer 67 and/or between the main body outer surface 55 and the adhesive layer 67. In this case, the criteria that have to be satisfied by the refractive index of the adhesive layer 67 are evident from inequality 2 described above.

In the present exemplary embodiment, the facets 69 of the Fresnel structure 65 are implemented in partly reflective fashion, such that the output coupling does not take place by means of the total internal reflection. Therefore, in the present exemplary embodiment, the adhesive layer 67 having the low refractive index is not applied above the Fresnel structure 65.

Above the adhesive layer 67 having the low refractive index, a further adhesive layer 71 is situated both at the main body inner surface 53 and at the main body outer surface 55, said further adhesive layer having a refractive index that is matched to the refractive index of the main body 52 in such a way that the two refractive indices differ from one another by not more than 5‰, and preferably differ from one another by not more than 1‰. This refractive-index-matched adhesive layer 71 is situated above the entire low refractive index adhesive layer. Moreover, the refractive-index-matched adhesive layer 71 is also applied on the Fresnel structure 65.

In the present exemplary embodiment, a protective film 73 is situated above the refractive-index-matched adhesive layer 71, the refractive index of said protective film likewise being matched to the refractive index of the main body 52. For the refractive index of the protective film 73, too, it holds true that it is chosen in relation to the refractive index of the main body 52 such that the two refractive indices deviate from one another by not more than 5‰, preferably by not more than 1‰. The radii of curvature of the surfaces of the protective films 73 that form the spectacle lens outer surface and the spectacle lens inner surface, respectively, correspond in each case to the basic curvature of the spectacle lens 51, which corresponds to the basic curvature of the main body 52.

By applying one of a plurality of refractive-index-matched layers or films on the low refractive index adhesive layer 67 and/or the Fresnel structure 65, it is possible to prevent the ambient light from being influenced in a manner perceptible to the user upon passing through the Fresnel structure 65 and/or the reflection surfaces TR1, TR2 and TR3.

In addition to the protection function, the film 73 used in the present exemplary embodiment can have further functions. In this regard, it can be equipped with an absorption or polarization function, for example, such that the spectacle lens can be used as a lens of sunglasses.

In the exemplary embodiment just described, a main body was used which was produced from an organic glass by means of an injection molding method. In principle, however, the main body can also be produced from a mineral glass. In a departure from the exemplary embodiment illustrated in FIG. 7, there is the possibility of providing only the reflection surface TR2 in the main body outer surface 55 with a concave effect. The curvatures of the reflection surfaces TR1 and TR3 then do not deviate from the basic curvature of the main body 52. Since in this case in the region of the main body inner surface 53 there is no converging effect of the reflection surfaces TR1 and TR3, the reflection surfaces TR1 and TR3 also do not adversely affect ambient light passing through the spectacle lens 51, such that the coating system on the main body inner surface can be dispensed with if the reflection surfaces TR1 and TR3 are embodied such that they are not concave. It goes without saying that there is also the possibility of providing only the reflection surfaces TR1 and TR3 at the main body inner surface with a converging effect. In this case, the coating system 59 will be present on the main body inner surface 53. Since the reflection surface TR2 in the main body outer surface 55 then does not have a converging effect, the coating system 61 on the main body outer surface 55 is not required. Only the Fresnel structure 65 is then filled with a refractive-index-matched material in order to avoid a negative influencing of ambient light passing through the Fresnel structure 65.

In the exemplary embodiment described with reference to FIG. 7, there is also the possibility of additionally superimposing one or more of the reflection surfaces TR1, TR2 and TR3 with a freeform surface, such that an imaging-aberration-reducing effect of the corresponding reflection surface can also be brought about besides the converging effect.

Figure 8:
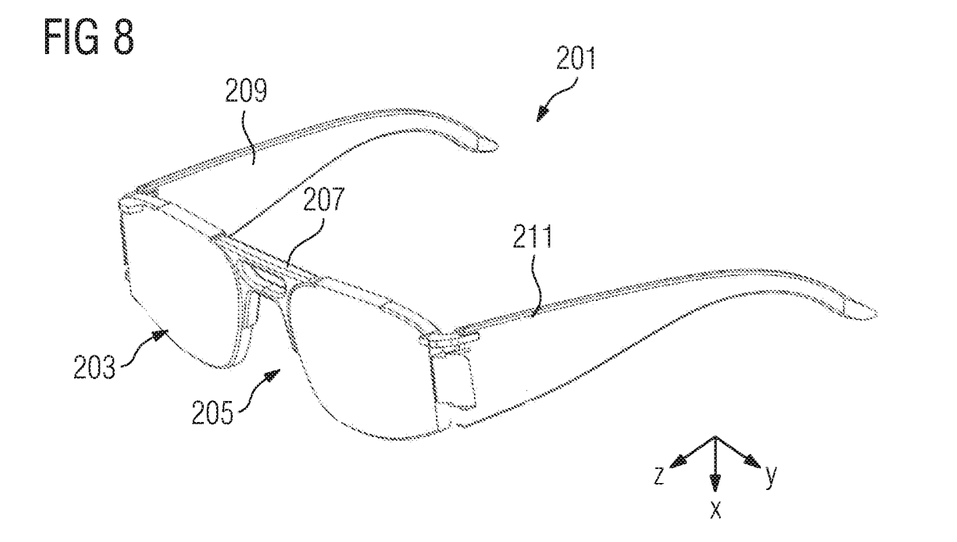
FIG. 8 shows one example of data goggles.

Data goggles comprising a spectacle lens according to the invention are described below. The spectacle lens is part of an imaging optical unit for generating a virtual image of an initial image represented on an image generator. Corresponding data goggles 201 are shown in FIG. 8.

Figure 9:
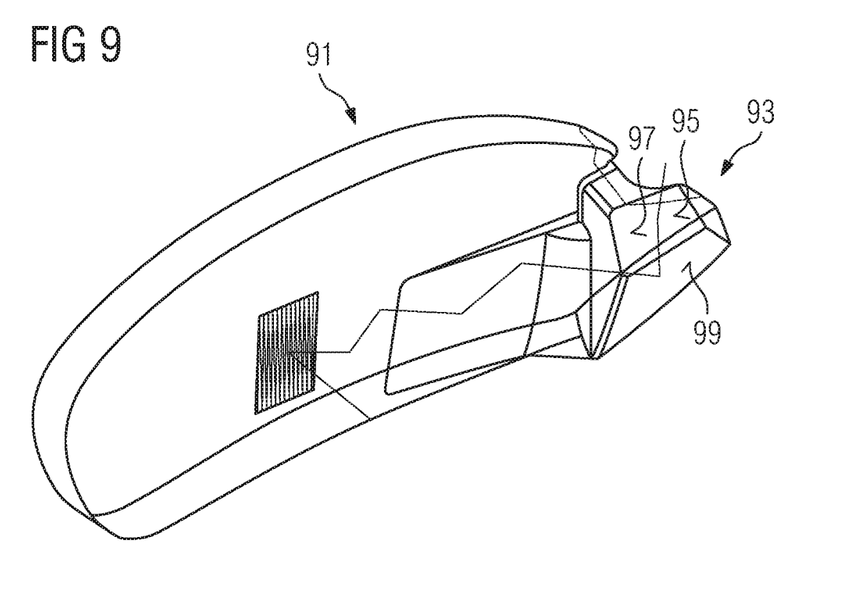
FIG. 9 shows data goggles with a prism as input coupling unit.

The data goggles 201 comprise two spectacle lenses 203, 205 according to the invention, which are held by a spectacle frame 207 with two spectacle earpieces 209, 211. The spectacle lenses 203, 205 can be configured as described in the exemplary embodiments. Situated in the spectacle earpiece 209, 211 or between the spectacle earpiece 209, 211 and the respective spectacle lens 203, 205, e.g. adjoining the input coupling section of the respective spectacle lens, there is an image generator, which can be configured as a liquid crystal display (LCD or LCoS display, LCoS: Liquid Crystal on Silicon), as a display based on light emitting diodes (LED display), as a display based on organic light emitting diodes (OLED display), etc. As part of the imaging optical unit, an input coupling unit can be arranged between the image generator and the spectacle lens, which input coupling unit supports the input coupling of an imaging beam path emanating from the image generator into the spectacle lens via the input coupling section. The input coupling unit can be configured e.g. as a prism having an entrance surface, a first mirror surface and a second mirror surface and can consist of glass or transparent plastic, wherein the entrance surface and the mirror surfaces are formed by surfaces of the prism. Such a spectacle lens 91 with a prism 93 as input coupling unit is illustrated in FIG. 9. The entrance surface 75 and the reflection surfaces 97, 99 of the prism 93 can be discerned in FIG. 9.

The present invention has been described in detail on the basis of exemplary embodiments for explanation purposes. However, a person skilled in the art recognizes that the invention is not restricted to the configuration of the exemplary embodiments. In particular, in all the exemplary embodiments an arbitrary number of reflection surfaces can be provided with a converging effect. Likewise, in all the exemplary embodiments there is the possibility of superimposing an arbitrary number of reflection surfaces with freeform surfaces in order to correct imaging aberrations. Moreover, the light guiding in the spectacle lens need not necessarily be carried out by means of total internal reflection. The light guiding with the aid of surfaces implemented in reflective or partly reflective fashion is likewise possible in principle. Moreover, the coatings mentioned in the exemplary embodiments can comprise more than the layers described or fewer than the layers described. By way of example, in the exemplary embodiment described with reference to FIG. 7, the refractive-index-matched adhesive layer can be omitted if the output coupling via the Fresnel structure is carried out by means of total internal reflection, the low refractive index adhesive layer is also applied above the Fresnel structure and the adhesive layer is suitable as adhesive for fixing the protective film. Likewise, the number of total internal reflections used between the input coupling section and the output coupling structure can be more than 4 or fewer than 3. Finally, it should also be pointed out that although the output coupling structure in the exemplary embodiments is a Fresnel structure, the present invention in principle can also be applied to spectacle lenses comprising a diffractive output coupling structure. The use of the present invention in conjunction with an inclined mirror as output coupling structure is not excluded either. Therefore, the present invention is intended to be restricted only by the appended claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for an imaging optical unit for generating a virtual image of an initial image represented on an image generator, the spectacle lens comprising:
   an inner surface that faces an eye of a user and an outer surface that faces away from the eye of the user;
   an input coupling section that couples an imaging beam path emanating from the initial image in between the inner surface and the outer surface of the spectacle lens;
   an output coupling structure provided in the spectacle lens that couples the imaging beam path out from the spectacle lens in the direction of the eye of the user; and
   a reflection surface disposed between the input coupling section and the output coupling structure in a region of the inner surface,
   wherein the imaging beam path is guided by reflections between the inner surface and the outer surface to the output coupling structure, and
   wherein the reflection surface is either indented or curved oppositely from the inner surface as viewed from an interior of the spectacle lens and the curvature of the reflection surface differs from a basic curvature of the inner surface of the spectacle lens.

2. The spectacle lens of claim 1, wherein the output coupling structure is configured exclusively for beam-deflecting.

3. The spectacle lens of claim 1, wherein the reflection surface is located such that it provides a last reflection of the imaging beam path upstream of the output coupling structure, and wherein the reflection surface is configured as a concavely curved reflection surface.

4. The spectacle lens of claim 3, wherein the reflections of the imaging beam path are provided by total internal reflection at one or both of the inner surface and the outer surface, and the concavely curved reflection surface is a surface section provided in one or both of the inner surface and the outer surface of the spectacle lens.

5. The spectacle lens of claim 1, wherein the reflection surface is located such that the reflection surface provides a penultimate reflection of the imaging beam path upstream of the output coupling structure, and wherein the reflection surface is configured as a concavely curved reflection surface.

6. The spectacle lens of claim 5, wherein the reflections of the imaging beam path are provided by total internal reflection at one or both of the inner surface and the outer surface, and the concavely curved reflection surface is a surface section provided in one or both of the inner surface and the outer surface of the spectacle lens.

7. The spectacle lens of claim 6,
   wherein the spectacle lens has a transparent main body having a first refractive index, into which the imaging beam path is coupled, the main body defining a main body inner surface corresponding to the inner surface of the spectacle lens and a main body outer surface corresponding to the outer surface of the spectacle lens, and the concavely curved surface section is defined in one or both of the main body inner surface and the main body outer surface, and
   wherein a first layer having a second refractive index is situated in a region of the concavely curved surface section, the second refractive index being such that in relation to the first refractive index a total internal reflection of light rays of the imaging beam path takes place at the interface between the main body and the first layer.

8. The spectacle lens of claim 7, wherein at least one second layer having a refractive index corresponding to the refractive index of a material of which the main body is formed is situated above the first layer.

9. The spectacle lens of claim 8, wherein the second layer comprises a film having a refractive index corresponding to the refractive index of the material forming the main body.

10. The spectacle lens of claim 8, wherein one or both of the first layer and the second layer comprises an adhesive layer.

11. The spectacle lens of claim 8, wherein the second layer comprises an adhesive layer adjoining the first layer and a film adjoining the adhesive layer and having a refractive index corresponding to the refractive index of the material forming the main body.

12. The spectacle lens of claim 1, wherein a freeform surface having properties that correct imaging aberrations is superimposed on the concavely curved reflection surface.

13. An imaging device that generates a virtual image, comprising:
   an image generator that provides an initial image; and
   a spectacle lens as claimed in claim 1 that is coupled to the image generator.

14. The imaging device of claim 13, wherein the image generator is coupled directly to the input coupling section.

15. The imaging device of claim 13, wherein the image generator is located adjacent to the input coupling section.

16. The imaging device of claim 13, wherein an input coupler that couples an imaging beam path emanating from the initial image in between the inner surface and the outer surface of the spectacle lens is disposed between the image generator and the input coupling section.

17. Data goggles, comprising at least one imaging device according to claim 13.

18. A spectacle lens for an imaging optical unit for generating a virtual image of an initial image represented on an image generator, the spectacle lens comprising:
   an inner surface that faces an eye of a user and an outer surface that has a spherical basic curvature and faces away from the eye of the user;
   an input coupling section that couples an imaging beam path emanating from the initial image in between the inner surface and the outer surface of the spectacle lens;
   an output coupling structure provided in the spectacle lens that couples the imaging beam path out from the spectacle lens in the direction of the eye of the user; and
   a reflection surface disposed exclusively between the input coupling section and the output coupling structure in a region of the outer surface,
   wherein the imaging beam path is guided by reflections between the inner surface and the outer surface to the output coupling structure, and
   wherein the reflection surface is curved concavely as viewed from an interior of the spectacle lens and the curvature of which differs from a basic curvature of the outer surface of the spectacle lens such that the reflection surface has an increased concavity relative to the basic curvature of the outer surface.

* * * * *